United States Patent
Kang et al.

(10) Patent No.: US 9,898,666 B2
(45) Date of Patent: Feb. 20, 2018

(54) APPARATUS AND METHOD FOR PROVIDING PRIMITIVE VISUAL KNOWLEDGE

(71) Applicant: Electronics and Telecommunications Research Institute, Daejeon (KR)

(72) Inventors: Kyu-Chang Kang, Daejeon (KR); Yong-Jin Kwon, Daejeon (KR); Jin-Young Moon, Daejeon (KR); Kyoung Park, Daejeon (KR); Chang-Seok Bae, Daejeon (KR); Jeun-Woo Lee, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 128 days.

(21) Appl. No.: 15/004,283

(22) Filed: Jan. 22, 2016

(65) Prior Publication Data
US 2016/0217329 A1 Jul. 28, 2016

(30) Foreign Application Priority Data
Jan. 22, 2015 (KR) .................. 10-2015-0010575

(51) Int. Cl.
*G06K 9/00* (2006.01)
*G06F 17/30* (2006.01)
*G06T 11/60* (2006.01)

(52) U.S. Cl.
CPC ... *G06K 9/00751* (2013.01); *G06F 17/30843* (2013.01); *G06K 9/00765* (2013.01); *G06T 11/60* (2013.01); *G06K 2009/00738* (2013.01)

(58) Field of Classification Search
CPC .... G06F 17/30843; G06K 2009/00738; G06K 9/00751; G06K 9/00765;
(Continued)

(56) References Cited

U.S. PATENT DOCUMENTS

| 6,492,998 B1 * | 12/2002 | Kim ................ G06F 17/30852 707/E17.028 |
| 7,509,581 B1 * | 3/2009 | Song ................ G06F 17/30817 715/719 |

(Continued)

FOREIGN PATENT DOCUMENTS

| KR | 10-0503424 B1 | 7/2005 |
| KR | 10-0669251 B1 | 1/2007 |
| KR | 10-1169093 B1 | 7/2012 |

*Primary Examiner* — Tom Y Lu
(74) *Attorney, Agent, or Firm* — Nelson Mullins Riley & Scarborough LLP

(57) ABSTRACT

An apparatus and method for providing primitive visual knowledge are disclosed. The method of providing primitive visual knowledge includes receiving an image in a form of a digital image sequence, dividing the received image into scenes, extracting a representative shot from each of the scenes, extracting objects from frames which compose the representative shot, extracting action verbs based on a mutual relationship between the extracted objects, selecting a frame best expressing the mutual relationship with the objects, which are the basis for the extracting of the action verbs, as a key frame, generating the primitive visual knowledge based on the selected key frame, storing the generated primitive visual knowledge in a database, and visualizing the primitive visual knowledge stored in the database to provide the primitive visual knowledge to a manager.

18 Claims, 4 Drawing Sheets

(58) Field of Classification Search
CPC ....... G06K 2009/4666; G06K 9/00718; G06K 9/00771; G06K 9/4604; G06T 11/60; G06T 7/0085; H04N 21/845; H04N 21/8549; H04N 5/445; H04N 7/18

See application file for complete search history.

(56) References Cited

U.S. PATENT DOCUMENTS

2005/0063579 A1    3/2005   Lee et al.
2007/0120863 A1    5/2007   Kim et al.

\* cited by examiner

APPARATUS AND METHOD FOR PROVIDING PRIMITIVE VISUAL KNOWLEDGE

CROSS-REFERENCE TO RELATED APPLICATION

This application claims priority to and the benefit of Korean Patent Application No. 2015-0010575, filed on Jan. 22, 2015, the disclosure of which is incorporated herein by reference in its entirety.

BACKGROUND

1. Field of the Invention

The present invention relates to an apparatus and method for providing primitive visual knowledge.

2. Discussion of Related Art

Globally, the development of technology for establishing and testing various action-based images to enhance the performance of intelligent CCTV is being conducted actively. This technology is used in the field of wandering sensing which senses an target staying more than a necessary time inside or outside of a public place, in the field of object-abandonment sensing which senses an object abandoned more than a specified time, in the field of object-theft sensing which senses a person who steals an object lying in some place, in the field of target tracking which tracks the same person in association with many sets of cameras, in the field of trespassing sensing which senses a person who comes in and out through a specific entrance or jumps over a wall, in the field of action sensing which senses individual actions such as fighting or falling-down, and in the field of crowd sensing which recognizes eyes of persons, persons doing crowd actions or a sole action, etc., and much effort is being made for improving performance.

However, there are not many cases of technology development for automatic devices in the fields described above, and there is a problem that a manager of a control center checks real images due to many false alarms, and in the case of images generated by a CCTV, there are problems in storing, processing, and analyzing the massive data of images because the images are obtained for 24 hours and 365 days.

SUMMARY OF THE INVENTION

The present invention is directed to an apparatus and method for extracting only important information from a moving image and standardizing it in the form of metadata to establish primitive visual knowledge, and visualizing the established primitive visual knowledge.

According to an aspect of the present invention, there is provided a method of providing primitive visual knowledge performed by a primitive visual knowledge providing apparatus.

The method of providing primitive visual knowledge according to embodiments of the present invention may include receiving an image in a form of a digital image sequence, dividing the received image into scenes, extracting a representative shot from each of the scenes, extracting objects from frames which compose the representative shot, extracting action verbs based on a mutual relationship between the extracted objects, selecting a frame best expressing the mutual relationship with the objects, which are the basis for the extracting of the action verbs, as a key frame, generating the primitive visual knowledge based on the selected key frame, storing the generated primitive visual knowledge in a database, and visualizing the primitive visual knowledge stored in the database to provide the primitive visual knowledge to a manager.

The dividing of the received image into scenes may include monitoring a change amount of the image in the received image, tagging a time point at which the change amount goes beyond a critical amount as a start point of a scene, and then continuing to monitor the change amount of the image, tagging a time point at which the change amount is equal to or smaller than the critical amount as an end point of the scene, separating an image in a section between the start point and the end point of the scene, and storing the separated image as a scene for analysis.

The extracting of the representative shot may include calculating an entropy in a section while moving along sections of separate scenes, and extracting a section having the highest entropy as the representative shot.

The extracting of the objects may include extracting and recognizing objects with respect to image frames composing the representative shot using a vision technique, and calculating coordinates of the objects on the image.

The extracting of the action verbs may include inferring a plurality of action verbs meeting a preestablished synthesis rule based on a relationship of a time-based change or a spatial change of the extracted objects, and assigning a ranking to each of the inferred action verbs.

The selecting of the frame best expressing the mutual relationship as the key frame include selecting an image frame having a highest ranking from a plurality of image frames composing the representative shot as the key frame.

The generating of the primitive visual knowledge may include generating the primitive visual knowledge by classifying the selected key frame, a visual word for a minimum bounding rectangle (MBR) region of objects included in the key frame, attributes of objects, locations of the objects on a screen, inferred action verbs, and a synthesis rule used in extracting the action verbs into syntactic elements and semantic elements.

The storing of the generated primitive visual knowledge in the database may include indexing the primitive visual knowledge in units of time, space, object, event, or visual word for convenience of searching the primitive visual knowledge, and storing indexing information in the database as key frame information which represents scenes.

The visualizing may include loading the primitive visual knowledge stored in the database into an interface for visualizing the primitive visual knowledge based on input constraints of a manager, and displaying and navigating the loaded primitive visual knowledge through the interface for visualizing the primitive visual knowledge.

The interface for visualizing the primitive visual knowledge may include a source navigation area configured to receive camera information, a scene navigation area configured to load an image according with the received camera information, and continuously list and display key frames which represents scenes of the loaded image, an object panel on which object composing information of a scene including a key frame selected from the continuously listed key frames is displayed, a relation panel on which an object-related graph composing event information included in the scene including the selected key frame is displayed, an event panel on which the event information included in the scene including the selected key frame is ranked and displayed, an interactive view panel for key frame on which the primitive visual knowledge is overlaid and displayed with a key frame representing the scene including the selected key frame, an interactive view panel for primitive data on which primitive data of the scene including the selected key frame is displayed, and a control panel for the manager.

The control panel may include a natural language control unit configured to input commands with a natural language, a command control unit configured to select the commands with button input, and a constraints control unit which permits the manager to directly input information when the command control unit is used.

According to another aspect of the present invention, there is provided an apparatus for providing primitive visual knowledge.

The apparatus for providing primitive visual knowledge according to embodiments of the present invention may include a user interface input unit, a user interface output unit, a network interface, a memory configured to store instructions, and a processor configured to execute the instructions. The instructions perform a primitive visual knowledge providing method which includes receiving an image in a form of a digital image sequence, dividing the received image into scenes, extracting a representative shot from each of the scenes, extracting objects from frames which compose the representative shot, extracting action verbs based on a mutual relationship among the extracted objects, selecting a frame best expressing the mutual relationship with the objects, which are the basis for the extracting of the action verbs, as a key frame, generating the primitive visual knowledge based on the selected key frame, storing the generated primitive visual knowledge in a database, and visualizing the primitive visual knowledge stored in the database to provide the primitive visual knowledge to a manager.

The dividing of the received image into scenes may include monitoring a change amount of an image in the received image, tagging a time point at which the change amount goes beyond a critical amount as a start point of a scene, and then continuing to monitor the change amount of the image, tagging a time point at which the change amount is equal to or smaller than the critical amount as an end point of the scene, separating an image in a section between the start point and the end point of the scene, and storing the separated image as a scene for analysis.

The extracting of the representative shot may include calculating an entropy in a section while moving along sections of separate scenes, and extracting a section having the highest entropy as the representative shot.

The extracting of the objects may include extracting and recognizing objects with respect to image frames composing the representative shot using a vision technique, and calculating coordinates of the objects on the image.

The extracting of the action verbs may include inferring a plurality of action verbs meeting a preestablished synthesis rule based on a relationship of a time-based change or a spatial change of the extracted objects, and assigning a ranking to each of the inferred action verbs.

The selecting of the frame best expressing the mutual relationship as the key frame include selecting an image frame having a highest ranking from a plurality of image frames composing the representative shot as the key frame.

The generating of the primitive visual knowledge may include generating the primitive visual knowledge by classifying the selected key frame, a visual word for a minimum bounding rectangle (MBR) region of objects included in the key frame, attributes of objects, locations of the objects on a screen, inferred action verbs, and a synthesis rule used in extracting the action verbs into syntactic elements and semantic elements.

The storing of the generated primitive visual knowledge in the database may include indexing the primitive visual knowledge in units of time, space, object, event, or visual word for convenience of searching the primitive visual knowledge, and storing indexing information in the database as key frame information which represents scenes.

The visualizing may include loading the primitive visual knowledge stored in the database into an interface for visualizing the primitive visual knowledge based on input constraints of a manager, and displaying and navigating the loaded primitive visual knowledge through the interface for visualizing the primitive visual knowledge.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
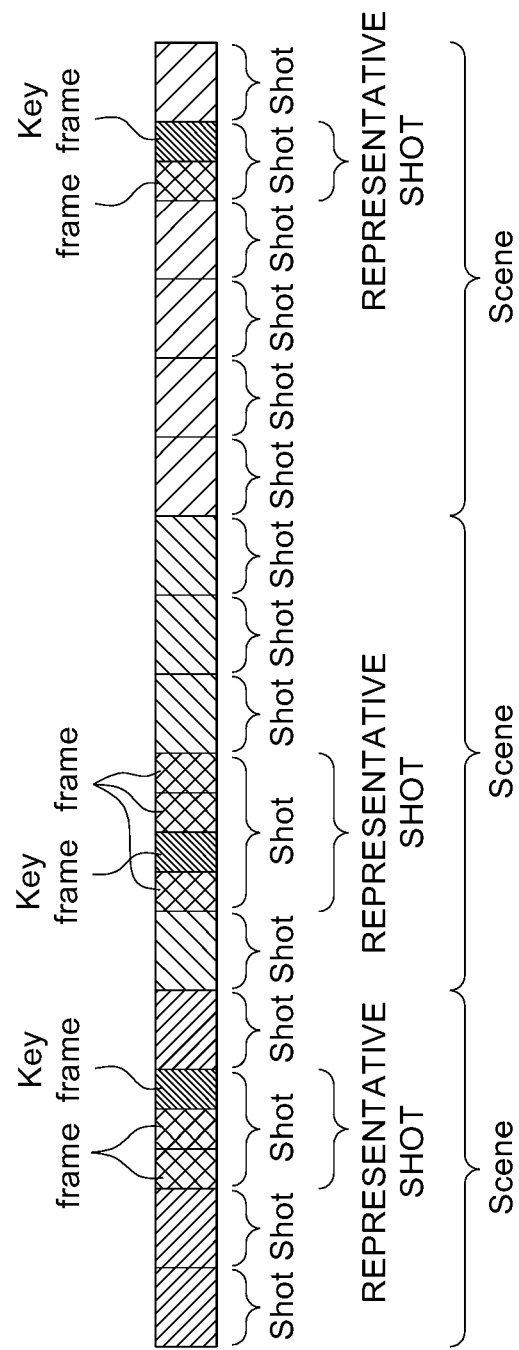
FIG. 1 is a conceptual diagram illustrating a structure of a scene.

While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

In describing the embodiments of the present invention, when it is determined that a detailed description on well known technology makes the subject matter of the present invention unnecessarily obscure, the detailed description will be omitted. Further, numerals used in the process of describing the present specification are only identification numbers to distinguish one element from another element.

Further, in this specification, it will be understood that when an element is referred to as being "connected" or "coupled" to another element, it can be directly connected or coupled to the other element. However, as long as a specific contrary description does not exist, an element may be connected or coupled to another element with a third element intervening therebetween.

Hereinafter, example embodiments are described with reference to the attached drawings, and the same or corresponding elements regardless of drawing numbers will be given the same reference numbers.

FIG. 1 is a conceptual diagram illustrating a structure of a scene. To facilitate the understanding of the present invention, hereinafter, terms such as a scene, a shot, a representative shot, a key frame, and primitive visual knowledge are briefly described with reference to FIG. 1.

Input of a primitive visual knowledge providing apparatus for establishing the primitive visual knowledge is aimed at a digital image sequence (for example, a moving picture, a digital motion picture, etc.). The digital image sequence refers to digital images continuously existing in a unit time, and generally a density of the digital image sequence may be denoted as a measurement of frames per second (for example, 10 frames per second or 20 frames per second).

Hereinafter, for convenience of understanding and description, a movie, which is a typical digital image sequence, is described as an example.

A scene is a minimum unit of a movie scenario. The scene in the movie refers to consecutive events that occurred in one place at the same time, and when at least one of the place and the time is changed, a scene becomes a different scene. The scene includes one or more shots, and one shot may be the scene. The shot refers to a smallest unit when the scene is divided into cuts, and generally, the shot refers to a continuous filming or recording, which starts when a director says "action" and ends when the director says "cut". These shots are put together to compose the scene, and a series of scenes are put together to compose a sequence.

In other words, in a general digital image sequence, a specified event appears in a unit of a scene, and the specified event includes one or more shots. Among the one or more shots composing the scene, when a shot including an event representing the scene is defined as a representative shot, the representative shot may include a frame including an event representing the scene. In more detail, when one frame including the event representing the scene in the representative shot is selected, this frame may be a key frame.

As a specific example of the digital image sequence, there is a closed-circuit television (CCTV) image. The CCTV image is a continuously stored image, and the division of the scene, the shot, etc. is ambiguous. Therefore, in the case of a continuously recorded digital image sequence such as the CCTV image, a normal situation (a situation in which an unusual event does not occur) and an abnormal situation (a situation in which the unusual event is expected) are divided based on specified critical amount information set by a manager, and each abnormal situation is treated as one scene. In the case of the CCTV image, one divided scene becomes one shot (a representative shot), and one frame representing an abnormal event is extracted from this shot and is used as the key frame.

The primitive visual knowledge refers to information included in a scene in a standardized metadata form, and a representative shot is extracted from a scene which is divided from a digital image sequence such as the CCTV image based on an event, objects are extracted (syntactic information of a scene) from the representative shot using a conventional vision technique, event information (semantic information of a scene) is inferred based on a mutual relationship between the extracted objects, and the two pieces of information are expressed in the standardized metadata form.

Figure 2:
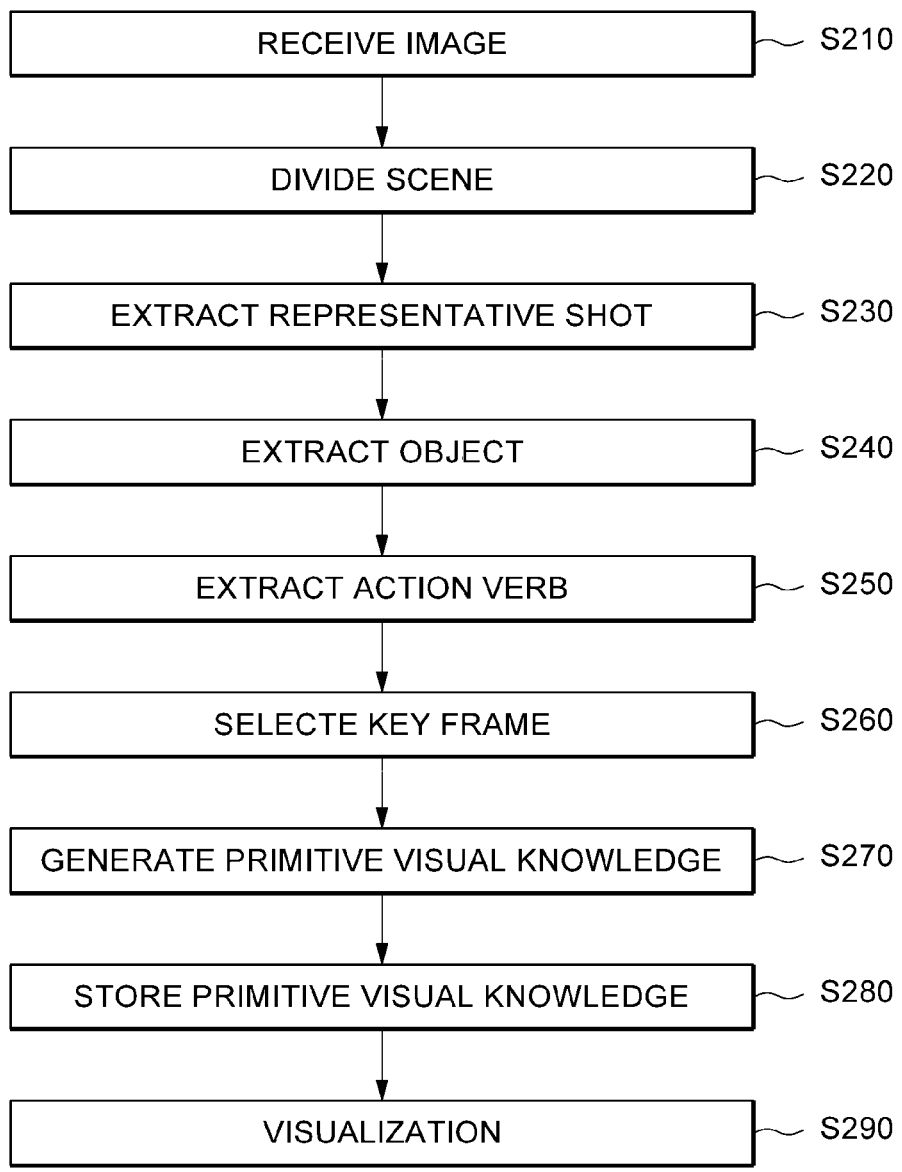
FIG. 2 is a flowchart illustrating a method of providing primitive visual knowledge performed by a primitive visual knowledge providing apparatus.

FIG. 2 is a flowchart illustrating a method of providing primitive visual knowledge performed by a primitive visual knowledge providing apparatus.

In operation S210, the primitive visual knowledge providing apparatus receives an image. Hereinafter, for convenience of description and understanding, the received image which is assumed to be a CCTV image, which is one of the digital image sequences, will be described.

In operation S220, the primitive visual knowledge providing apparatus divides the received image into scenes. The primitive visual knowledge providing apparatus monitors a change amount of an image in the received image, tags a time point at which the change amount goes beyond a critical amount as a start point of a scene, and then continues to monitor the change amount of the image. Then, the primitive visual knowledge providing apparatus tags a time point at which the change amount is equal to or smaller than the critical amount as an end point of the scene, separates an image in a section between the start point and the end point of the scene, and stores the separated image as a scene for analysis. The critical amount may be determined according to the accuracy of a scene division by a manager after the manager increases the critical amount and monitors the accuracy. Further, the critical amount may be determined based on prior learning according to an event type to be extracted from a scene. For example, the primitive visual knowledge providing apparatus, when an event of interest is an event having large motion in the CCTV image, may divide scenes focused on the event having large motion and prevent scenes from being divided into excessively small units by setting the critical amount high.

In operation S230, the primitive visual knowledge providing apparatus extracts a representative shot from each of the divided scenes. For example, the primitive visual knowledge providing apparatus may calculate an entropy in a section while moving along sections of separate scenes using a sliding window technique, and may extract a section having the highest entropy as the representative shot.

In operation S240, the primitive visual knowledge providing apparatus extracts objects from frames which compose the representative shot focused on a noun. For example, the primitive visual knowledge providing apparatus may extract and recognize objects with respect to image frames composing the representative shot using a conventional vision technique, and calculates coordinates of the objects on the image.

In operation S250, the primitive visual knowledge providing apparatus extracts action verbs based on a mutual relationship among the extracted objects. For example, an action about an event of interest is defined in a standardized form such as an ontology, a synthesis rule of unit actions composing the defined action may be preestablished. The primitive visual knowledge providing apparatus may infer a plurality of action verbs meeting a preestablished synthesis rule based on a relationship of a time-based change and/or a spatial change (for example, a movement velocity, a movement direction, a combination of objects forming mutual relationship, etc.) with respect to the extracted objects, and assigning a ranking to each of the inferred action verbs. Generally, a plurality of action verbs may be inferred from various pieces of relation information among objects, and a ranking may be assigned to each of the inferred action verbs. The action definition and the synthesis rule define modeling of actions, and after properties of a motion of a part of a human body, various actions of one man, actions that occurred between two objects, and group actions that occurred in a group composed of a plurality of objects are investigated, the action definition and the synthesis rule may be established using a standardized ontology based on the investigated property.

In operation S260, the primitive visual knowledge providing apparatus selects a frame best expressing the mutual relationship with the objects, which are the basis for the extracting of the action verbs, as a key frame. For example, the primitive visual knowledge providing apparatus may select an image frame having a highest ranking from a plurality of image frames composing the representative shot as the key frame.

In operation S270, the primitive visual knowledge providing apparatus generates the primitive visual knowledge based on the selected key frame. For example, the primitive visual knowledge providing apparatus may generate the primitive visual knowledge in a standardized form such as XML by classifying the selected key frame, a visual word for a minimum bounding rectangle (MBR) region of objects included in the key frame, attributes of objects, locations of the objects on a screen, inferred action verbs, and a synthesis rule used in extracting the action verbs into syntactic elements and semantic elements. Additionally, the primitive visual knowledge may include a type of a camera, a location of a camera, a management ID of a camera, a path through which a primitive image is stored, a name of the primitive image, a frame number of the key frame, etc.

In operation S280, the primitive visual knowledge providing apparatus stores the generated primitive visual knowledge in a database. For example, the primitive visual knowledge providing apparatus performs indexing on the primitive visual knowledge in units of time, space, object, event, or visual word for convenience of searching the primitive visual knowledge, and storing indexing information in a physical database as key frame information which represents scenes.

In operation S290, the primitive visual knowledge providing apparatus visualizes the primitive visual knowledge stored in the database to provide the primitive visual knowledge to a manager. That is, the primitive visual knowledge providing apparatus provides an interface for visualizing the primitive visual knowledge. Accordingly, the primitive visual knowledge providing apparatus loads the primitive visual knowledge stored in the database into an interface for visualizing the primitive visual knowledge based on input constraints of a manager, and the loaded primitive visual knowledge may be displayed and navigated through the interface for visualizing the primitive visual knowledge.

Figure 3:
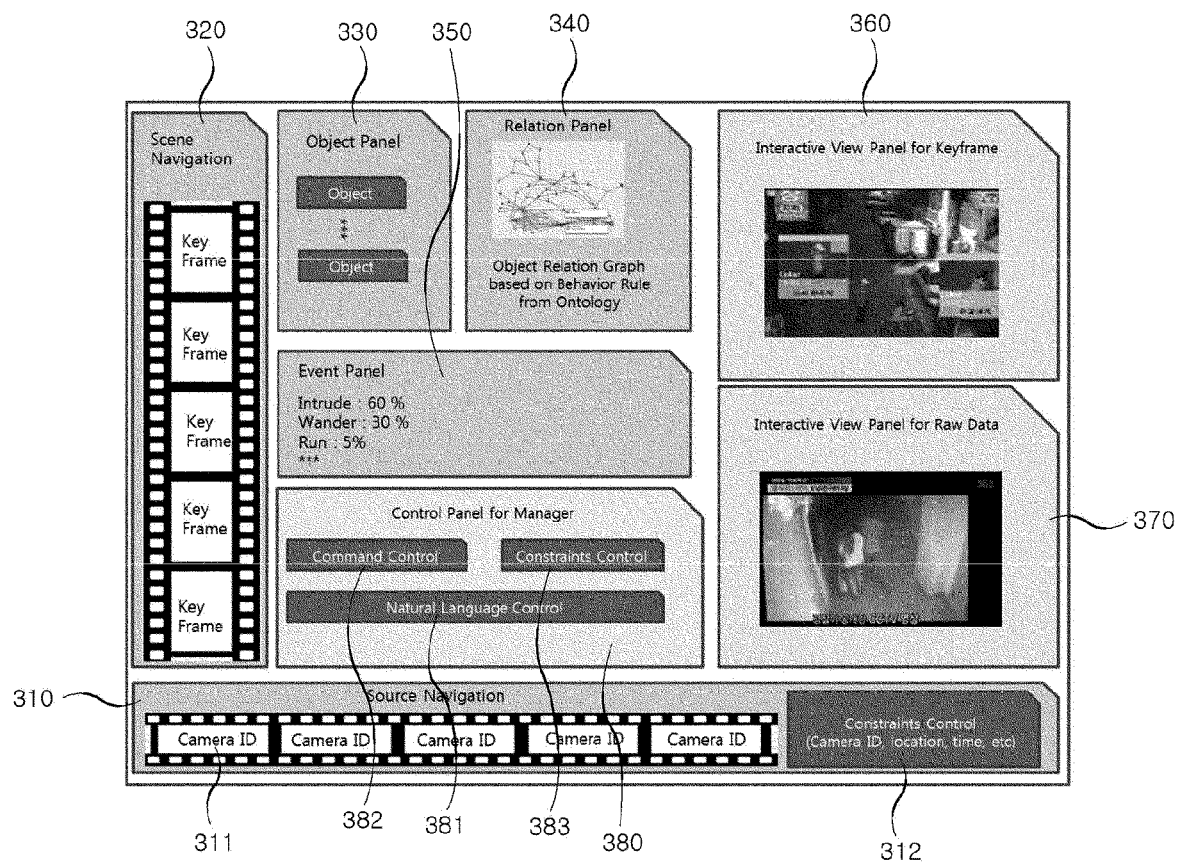
FIG. 3 is a diagram illustrating an embodiment of an interface for visualizing the primitive visual knowledge.

For example, FIG. 3 is a diagram illustrating an embodiment of an interface for visualizing the primitive visual knowledge. Referring to FIG. 3, when a manager clicks a camera ID 311, or directly inputs information on a camera identity, a camera location, a time, etc., by a constraints control unit 312, an image in accordance with input items may be loaded into a scene navigation area 320. At this time, key frames representing scenes of the image loaded in the scene navigation area 320 may be continuously listed. Subsequently, when the manager selects one of the key frames listed continuously, information on a scene which includes the selected key frame is output. That is, object composing information of a scene may be displayed on an object panel 330, an object-related graph composing event information included in the scene may be displayed on a relation panel 340, event information included in the scene may be ranked and displayed on an event panel 350, the primitive visual knowledge may be overlaid and displayed with a key frame representing the scene on an interactive view panel for key frame 360, and primitive data of the scene may be displayed on an interactive view panel for raw data 370.

Further, a control panel for the manager 380 may include a natural language control unit 381 for inputting commands with a natural language, a command control unit 382 for selecting the commands with button inputs, and a constraints control unit 383 which permits the manager to directly input information (for example, name input of a specified object, etc.) when the command control unit is used.

Additionally, when the manager clicks a specified object in the object panel 330, information on the object may be displayed on the interactive view panel for key frame 360.

Figure 4:
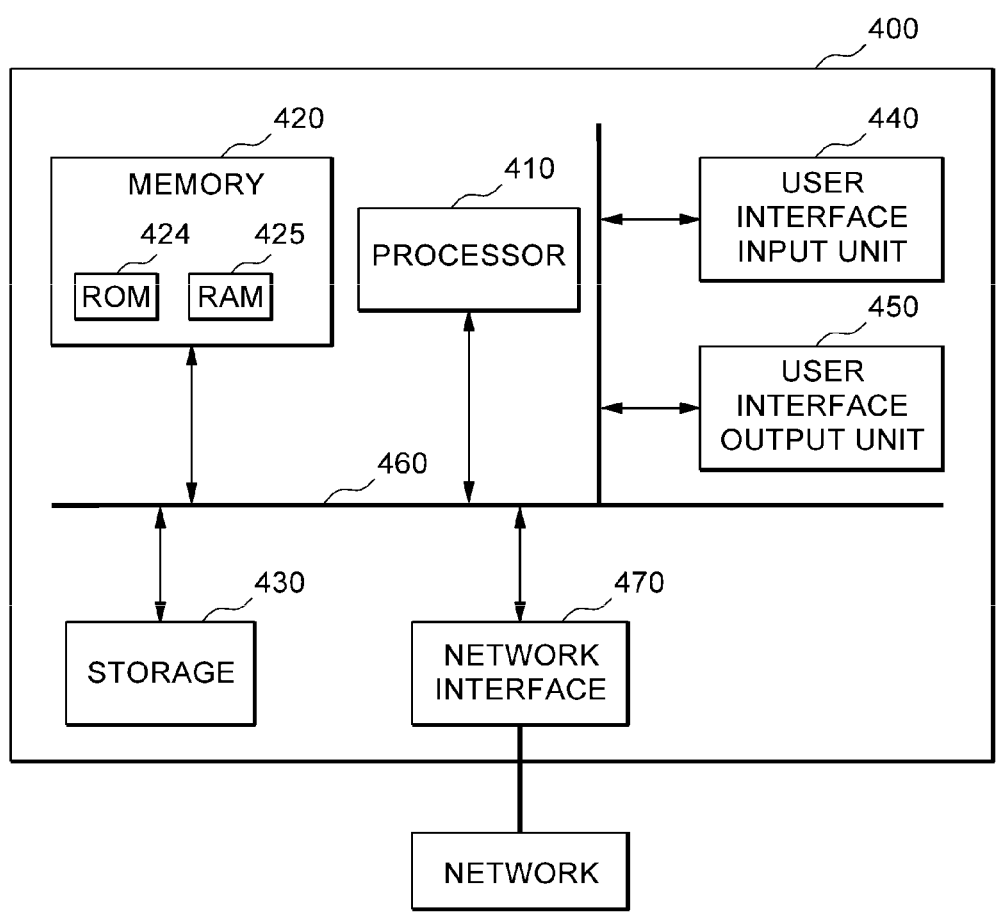
FIG. 4 is a diagram schematically illustrating a structure of a primitive visual knowledge providing apparatus.

The method of providing primitive visual knowledge according to embodiments of the present invention may be implemented in a form of program instructions executable through a scheme which electronically processes information, and may be recorded in a storage media. For example, FIG. 4 is a diagram schematically illustrating a structure of a primitive visual knowledge providing apparatus. As shown in FIG. 4, the primitive visual knowledge providing apparatus 400 may include at least one element of one or more processors 410, a memory 420, a storage unit 430, a user interface input unit 440, and a user interface output unit 450, which may communicate with each other through a bus 460. Further, the primitive visual knowledge providing apparatus 400 may include a network interface 470 for connecting to a network. The processor 410 may be a central processing unit (CPU) or semiconductor device which executes process instructions stored in the memory 420 and/or the storage unit 430. The memory 420 and the storage unit 430 may include various forms of volatile or non-volatile memory media. For example, the memory 420 may include a read only memory (ROM) 424 and a random access memory (RAM) 425.

Accordingly, the method of providing the primitive visual knowledge according to embodiments of the present invention may be implemented by computer or may be implemented by a non-volatile computer-readable media in which computer-executable instructions are stored. The instructions may perform the method according to at least one embodiment of the present invention when executed by the processor.

The primitive visual knowledge providing apparatus according to the embodiment of the present invention extracts only important information from a moving image and standardizes it in the form of metadata to establish a primitive visual knowledge, and visualizes the established primitive visual knowledge, so that a manager who monitors the moving image can rapidly search the moving image and can monitor events included in the moving image.

This written description sets forth the best mode of the invention and provides examples to describe the invention and to enable a person of ordinary skill in the art to make and use the invention. Accordingly, it will be apparent to those skilled in the art that various modifications, changes, and variations may be made in the examples without departing from the scope of the invention.

DESCRIPTION OF THE SYMBOLS

400: primitive visual knowledge providing apparatus
410: processor
420: memory
430: storage unit
440: user interface input unit
450: user interface output unit
460: bus
470: network interface

What is claimed is:

1. A method of providing primitive visual knowledge performed by a primitive visual knowledge providing apparatus, the method comprising:
receiving an image video in a form of a digital image sequence;
dividing the received image video into scenes;
extracting a representative shot from each of the scenes;
extracting objects from frames which compose the representative shot;
extracting action verbs based on a mutual relationship between the extracted objects;

selecting a frame best expressing the mutual relationship with the objects, which are the basis for the extracting of the action verbs, as a key frame;

generating the primitive visual knowledge based on the selected key frame;

storing the generated primitive visual knowledge in a database; and visualizing the primitive visual knowledge stored in the database to provide the primitive visual knowledge to a manager, wherein the extracting of the representative shot includes:

calculating an entropy in a section while moving along sections of separate scenes; and extracting a section having the highest entropy as the representative shot.

2. The method of claim 1, wherein the dividing of the received image video into scenes includes:

monitoring a change amount of the image video in the received image video;

tagging a time point at which the change amount goes beyond a critical amount as a start point of a scene, and continuing to monitor the change amount of the image;

tagging a time point at which the change amount is equal to or smaller than the critical amount as an end point of the scene; and separating an image video in a section between the start point and the end point of the scene, and storing the separated image video as a scene for analysis.

3. The method of claim 1, wherein the extracting of the objects includes:

extracting and recognizing objects with respect to image frames composing the representative shot using a vision technique; and calculating coordinates of the objects on the image.

4. The method of claim 1, wherein the extracting of the action verbs includes:

inferring a plurality of action verbs meeting a preestablished synthesis rule based on a relationship of a time-based change or a spatial change of the extracted objects; and assigning a ranking to each of the inferred action verbs.

5. The method of claim 1, wherein the selecting of the frame best expressing the mutual relationship as the key frame includes selecting an image frame having a highest ranking from a plurality of image frames composing the representative shot as the key frame.

6. The method of claim 1, wherein the generating of the primitive visual knowledge includes classifying the selected key frame, a visual word for a minimum bounding rectangle (MBR) region of objects included in the key frame, attributes of objects, locations of the objects on a screen, inferred action verbs, and a synthesis rule used in extracting the action verbs into syntactic elements and semantic elements to generate the primitive visual knowledge.

7. The method of claim 1, wherein the storing of the generated primitive visual knowledge in the database includes:

indexing the primitive visual knowledge in units of time, space, object, event, or visual word for convenience of searching the primitive visual knowledge; and storing indexing information in the database as key frame information which represents scenes.

8. The method of claim 1, wherein the visualizing includes:

loading the primitive visual knowledge stored in the database into an interface for visualizing the primitive visual knowledge based on input constraints of a manager; and displaying and navigating the loaded primitive visual knowledge through the interface for visualizing the primitive visual knowledge.

9. The method of claim 8, wherein the interface for visualizing the primitive visual knowledge includes:

a source navigation area configured to receive camera information;

a scene navigation area configured to load an image video in accordance with the received camera information, and continuously list and display key frames which represents scenes of the loaded image;

an object panel on which object composing information of a scene including a key frame selected from the continuously listed key frames is displayed;

a relation panel on which an object-related graph composing event information included in the scene including the selected key frame is displayed;

an event panel on which the event information included in the scene including the selected key frame is ranked and displayed;

an interactive view panel for key frame on which the primitive visual knowledge is overlaid and displayed with a key frame representing the scene including the selected key frame;

an interactive view panel for primitive data on which primitive data of the scene including the selected key frame is displayed; and a control panel for the manager.

10. The method of claim 9, wherein the control panel includes:

a natural language control unit configured to input commands with a natural language;

a command control unit configured to select the commands with button input; and a constraints control unit which permits the manager to directly input information when the command control unit is used.

11. An apparatus for providing primitive visual knowledge, comprising:

a user interface input unit;

a user interface output unit;

a network interface;

a memory configured to store instructions; and a processor configured to execute the instructions, wherein the instructions perform a primitive visual knowledge providing method, the method comprising:

receiving an image video in a form of a digital image sequence;

dividing the received image video into scenes;

extracting a representative shot from each of the scenes;

extracting objects from frames which compose the representative shot;

extracting action verbs based on a mutual relationship among the extracted objects;

selecting a frame best expressing the mutual relationship with the objects, which are the basis for the extracting of the action verbs, as a key frame;

generating the primitive visual knowledge based on the selected key frame;

storing the generated primitive visual knowledge in a database; and visualizing the primitive visual knowledge stored in the database to provide the primitive visual knowledge to a manager, wherein the extracting of the representative shot includes:

calculating an entropy in a section while moving along sections of separate scenes; and extracting a section having the highest entropy as the representative shot.

12. The apparatus of claim 11, wherein the dividing of the received image video into scenes includes:

monitoring a change amount of an image video in the received image video;

tagging a time point at which the change amount goes beyond a critical amount as a start point of a scene, and continuing to monitor the change amount of the image;

tagging a time point at which the change amount is equal to or smaller than the critical amount as an end point of the scene; and separating an image video in a section between the start point and the end point of the scene, and storing the separated image video as a scene for analysis.

13. The apparatus of claim 11, wherein the extracting of the objects includes:

extracting and recognizing objects with respect to image frames composing the representative shot using a vision technique; and calculating coordinates of the objects on the image.

14. The apparatus of claim 11, wherein the extracting of the action verbs includes:

inferring a plurality of action verbs meeting a preestablished synthesis rule based on a relationship of a time-based change or a spatial change of the extracted objects; and assigning a ranking to each of the inferred action verbs.

15. The apparatus of claim 11, wherein the selecting of the frame best expressing the mutual relationship as the key frame includes selecting an image frame having a highest ranking from a plurality of image frames composing the representative shot as the key frame.

16. The apparatus of claim 11, wherein the generating of the primitive visual knowledge includes classifying the selected key frame, a visual word for a minimum bounding rectangle (MBR) region of objects included in the key frame, attributes of objects, locations of the objects on a screen, inferred action verbs, and a synthesis rule used in extracting the action verbs into syntactic elements and semantic elements to generate the primitive visual knowledge.

17. The apparatus of claim 11, wherein the storing of the generated primitive visual knowledge in the database includes:

indexing the primitive visual knowledge in units of time, space, object, event, or visual word for convenience of searching the primitive visual knowledge; and storing indexing information in the database as key frame information which represents scenes.

18. The apparatus of claim 11, wherein the visualizing includes:

loading the primitive visual knowledge stored in the database into an interface for visualizing the primitive visual knowledge based on input constraints of a manager; and displaying and navigating the loaded primitive visual knowledge through the interface for visualizing the primitive visual knowledge.

* * * * *